Dec. 29, 1964 J. M. AUSTIN ETAL 3,163,850

RECORD SCATTER VARIABLE

Filed Dec. 27, 1960

INVENTORS
JOHN M. AUSTIN
ARMAND E. CLOUTIER
MICHAEL J. MASTRIANNI
BY Carl C. Kling
ATTORNEY

3,163,850
RECORD SCATTER VARIABLE

John M. Austin, Poughkeepsie, Armand E. Cloutier, Hyde Park, and Michael J. Mastrianni, Poughkeepsie, N.Y., assignors to International Business Machines Corporation, New York, N.Y., a corporation of New York Filed Dec. 27, 1960, Ser. No. 78,678
1 Claim. (Cl. 340—172.5)

The invention relates to data processing systems having capacity for record scatter or record gather operations, that is, directing data to or from small blocks of a memory, from or to a single block of the memory. It relates more particularly to a system for directing data to or from locations within the small blocks of memory, which locations are in turn displaced from one another by an increment which may vary from small block to small block.

Copending commonly assigned U.S. Patent 2,968,027, January 10, 1961, James A. McDonnell, Joseph M. Terlato and Jack E. Greene, Serial Number 758,063, filed August 29, 1958, entitled "Data Processing System Memory Controls," discloses Record Scatter and Record Gather (Scatter Read or Scatter Write) operation control.

The standard record scatter operation directs a short series of successive data words from a long series of locations (single block) to a first area of memory (small block) then directs a second short series of data words from the single block to a second small block in memory, and so on. Data words stored at consecutive locations within the single block are moved to consecutive locations within the small block, according to a record definition word RDW, except for the first word following a scatter change which goes to the start address location of the new RDW.

For example, words A–T, stored in single block 1001–1020, could be placed in four small blocks scattered according to the following instruction and control words:

Scatter Instruction (4001) RS 0074 3001

Positions 4–5 of the scatter instruction specify index word 74 which contains the single block address index word address. Positions 2–5 of the index word contain the single block address SBA.

SBA Index Word (0074) +XX 1001 XXXX

Positions 6–9 of the scatter instruction specify the address of the RDW.

RDW (3001) +00 2001 2006

The first six words from the single block pass to the six positions of the first small block delimited by the first record definition word.

| Single Block | Small Block |
|---|---|
| (1001)A | 2001 |
| (1002)B | 2002 |
| (1003)C | 2003 |
| (1004)D | 2004 |
| (1005)E | 2005 |
| (1006)F | 2006 |

RDW 3002 +00 2101 2104

The next four words from the single block pass to the four small block positions delimited by the second record definition word.

| | |
|---|---|
| (1007)G | 2101 |
| (1008)H | 2102 |
| (1009)I | 2103 |
| (1010)J | 2104 |

RDW 3003 +00 2221 2226

The next six words from the single block pass to the six small block positions deliminted by the third record definition word.

| | |
|---|---|
| (1011)K | 2221 |
| (1012)L | 2222 |
| (1013)M | 2223 |
| (1014)N | 2224 |
| (1015)O | 2225 |
| (1016)P | 2226 |

RDW 3004 —00 2302 2305

The next four words from the single block pass to the four small block positions delimited by the fourth record definition word. The minus sign indicates that this is the last RDW word in the series.

| | |
|---|---|
| (1017)Q | 2302 |
| (1018)R | 2303 |
| (1019)R | 2304 |
| (1020)T | 2305 |

The standard record scatter operation, as known to prior art, thus places consecutive words from the single block into consecutive positions of a first small block, second small block, third small block and so on.

An illustrative data block might contain, in consecutive words, part names in alphabetic sequence. It is advantageous in certain situations to open the sequence of words to leave blank addresses (for part numbers, amounts, cost and supplier) within the small block memory areas available. Capability to scatter the part names into small blocks selected by RDW is desirable, as is the capability to leave four addresses blank following each part name.

Such opening of space between data words can be accomplished according to the disclosure of the McDonnell, Terlato and Greene patent, cited above, by the use of repeated record scatter operations based on a special series of single-word record definition words, each of which has identical start and stop addresses which vary from those of the previous RDW by the desired increment. This operation, requiring a large number of RDW's and a similar large number of scatter instructions, can consume both program time and programmer time in large tabulating operations. An alternative method of opening space between data words, following the McDonnell et al. patent, would be to provide a separate (+N) adder for each separation required. A +5 adder, a +3 adder and a +77 adder, for example, might be desirable, in place of the +1 adder. Such a method is very time or hardware consuming.

Accordingly, an object of the invention is to provide a second level of positioning of data words within a scatter area in memory as a result of a record scatter variable (RSV) operation, according to a single record definition word having a variable increment field.

A similar object is to accomplish a record gather variable (RGV) operation.

The RSV operation, for example has the capability of opening a sequence of part names A–T, stored in consecutive sequence within a single block, to open sequences within small blocks. The small block open sequences can have blank addresses for part numbers, amounts, cost and supplier, if the variable increment chosen is "5."

The following instruction and control words, for example, produce the record scatter variable word placements shown:

(4041) RSV Instruction RSV 0079 3011

Positions 4 and 5 of the RSV instruction specify index word 79, which contains the address of the single block.

(0079) Single Block Address +XX 2350 XXXX

Positions 6–9 of the RSV instruction specify the address of the RDW.

(3011) RDW +05 2401 2421

The first five words from the single block pass to the five small block positions, each separated by five locations from the other, delimited by the first RDW.

| | |
|---|---|
| (2350)A | 2401 |
| (2351)B | 2406 |
| (2352)C | 2411 |
| (2353)D | 2416 |
| (2354)E | 2421 |

(3012) RDW +05 2531 2451

The second five words from the single block pass to the five small block positions specified by the second RDW.

| | |
|---|---|
| (2355)F | 2431 |
| (2356)G | 2436 |
| (2357)H | 2441 |
| (2358)I | 2446 |
| (2359)J | 2451 |

(3013) RDW —05 2500 2545

The remaining words from the single block pass to a small block position specified by the final RDW. The minus sign identifies the final RDW.

| | |
|---|---|
| (2360)K | 2500 |
| (2361)L | 2505 |
| (2362)M | 2510 |
| (2363)N | 2515 |
| (2364)O | 2520 |
| (2365)P | 2525 |
| (2366)Q | 2530 |
| (2367)R | 2535 |
| (2368)S | 2540 |
| (2369)T | 2545 |

Similarly, it could be advantageous to tabulate as follows:

| Part Name | Number | Amount | Cost | Supplier |
|---|---|---|---|---|
| 2401 | 2402 | 2403 | 2404 | 2405 |
| 2406 | 2407 | 2408 | 2409 | 2410 |
| 2411 | 2412 | 2413 | 2414 | 2415 |
| . . . | . . . | . . . | . . . | . . . |
| 2431 | 2432 | 2433 | 2434 | 2435 |
| . . . | . . . | . . . | . . . | . . . |
| 2545 | 2546 | 2547 | 2548 | 2549 |
| . . . | . . . | | | |

A feature of the invention is the use of circuits normally available in the applicable type of computer but not being fully used during execution of normal scatter instructions.

The standard word format leaves two RDW digits unused in the McDonnell et al. patent disclosure, for example, which are utilized to store the variable increment. The variable increment thus stored is added to the start address by the main computer adder, and returned to the start (working) register, updating the working address each cycle by utilizing the main adder.

The foregoing and other objects, features and advantages of the invention will be apparent from the following more particular description of a preferred embodiment of the invention, as illustrated in the accompanying drawings.

FIG. 1 illustrates a computer system in which RSV and RGV operations can be carried out. The system operates on a stored program of instruction words and utilizes certain record definition words.

Figures 1, 2, 3:
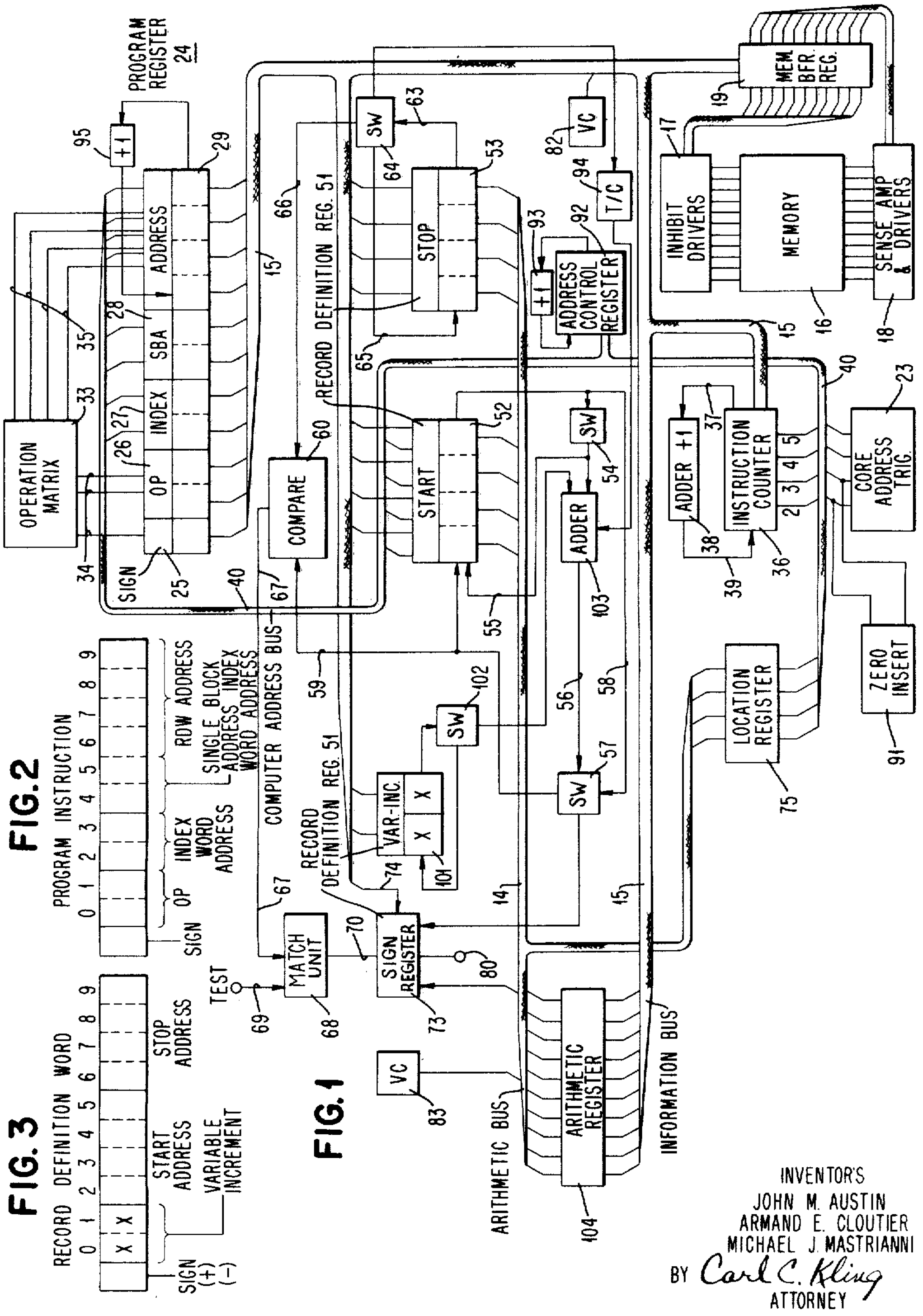
FIG. 1 illustrates in block diagram form a system according to the invention.
FIG. 2 shows the format of an instruction word.
FIG. 3 shows the format of a record definition word RDW.

FIG. 2 is a chart of the program instruction word format for the RSV instruction. The sign and position 0–1 specify the RSV operation in machine language code. Positions 2–3 are reserved for indexing. If indexing is involved, positions 2–3 locate an index word which is added to the address portion (positions 6–9) of the instruction.

Positions 4–5 locate an index word, positions 2–5 of which form the single block address.

Positions 6–9 specify the address of the first RDW (record definition word).

FIG. 3 is a chart of the record definition word. Positions 0–1 specify the variable increment; positions 2–5 the start address of the small block; positions 6–9 the stop address of the small block. A plus sign indicates that another RDW follows; a minus sign marks the last RDW.

The data information and the instruction information processed through the preferred embodiment system are represented in 2-out-of-5 code according to the table below:

| Dec. Values | Bit Values | | | | |
|---|---|---|---|---|---|
| | 6 | 3 | 2 | 1 | 0 |
| 0 | | | x | x | |
| 1 | | | | x | x |
| 2 | | | x | | x |
| 3 | | x | | | x |
| 4 | | x | | x | |
| 5 | | x | x | | |
| 6 | x | | | | x |
| 7 | x | | | x | |
| 8 | x | | x | | |
| 9 | x | x | | | |

Data and instruction information is transmitted through the system by means of various flow paths and busses, shown in FIG. 1. The Information bus 15 (IB) comprises 53 lines over which a single word of 10 digits plus sign, is transmitted in parallel in a single memory cycle. The Computer Address bus 40 (CAB) comprises 20 lines over which a four-digit address is transmitted in parallel. The Arithmetic bus 14 (AB) comprises 53 lines over which information is transmitted parallel by word between internal computer registers. Single lines generally are used to transmit 2-out-of-5 digits, control signals, timing signals or gate signals.

Addressing of memory for selecting a location is under control of Core Address triggers 23 into which a 4-digit address is set up, selecting any one of up to 9,990 word storage locations in memory 16.

Programming the system to effect a routine operation is under control of a variety of instructions. For the RSV instruction there is provided a Program register 24 comprised of a Sign register 25, a 2-position Op register 26, a 2-position Index register 27, a 2-position Single Block Address Index register 28, and a 4-position Address register 29. Instructions, usually stored in sequential locations in Memory 16 during a preliminary loading operation, are obtained from an input peripheral device such as a tape or card input unit, not shown.

Interpretation of the instructions of a routine is effected by Operation Matrix 33 connected to lines 34 and 35 through which are transmitted respectively the operation codes and the address information. Selection control of the instructions stored in memory is by Instruction Counter 36 which has parallel connections to Core Address triggers 23 which locate the instruction in memory. The Core Address triggers are also settable from the Computer Address bus 40 and Zero Insert block 91.

Instruction Counter 36 is usually "one-upped" every instruction operation by plus-one adder 38 which is connected by lines 37 and 39. The plus-one adder, sometimes called a "one-upper," is essentially a translator capable of supplying a bit structure output greater in value by one than the bit structure input.

Controls for record scatter variable and record gather variable include Record Definition registers 51, which includes Sign register 73, Variable Increment register 101, four-position Start register 52 and four-position Stop register 53. These registers connect to the Arithmetic bus 14 and to the Information bus 15. Start register 52 also connects to the Computer Address bus 40 and to the main computer Adder 103, switch 54, line 56, switch 57 and lines 58–59. Regenerative readin line 55 connects the Start register back to itself. Stop register 53 has a regenerative path which includes line 63, switch 64 and line 65. Stop register 53 connects via true/complement switch 94 to main computer Adder 103 for a Start address $<$ Stop address determination.

Compare unit 60 is connected to the Start and Stop registers to compare the working address with the stop address. Stop register 53 connects to the Compare unit via line 63, switch 64 and line 66. Start register 52 is initially connected to Compare unit 60 by lines 58 and 59 and switch 57. On variable increment cycles, start register 52 connects to compare unit 60 via Adder 103, line 56, switch 57 and line 59. An equal signal from Compare unit 60 via line 67 to match unit 68 coinciding with a test signal to Match unit 68 via line 69 at the appropriate time of an operation enables a test signal to pass through line 70 to test the sign in Sign register 73. The Sign register, controlled by input line 74 connected to Information bus 15, holds the sign, or indicator, of the RDW.

The selection of RDW's from Memory is effected by four-position Address Control register 92 which connects to Computer Address bus 40. The Address Control register is also conected to plus-one adder 93.

Various loading operations are necessary preliminary to any program operation. Sequential locations of memory receive RDW's. These RDW's define the specific areas of the memory which data is to be read into the case of scatter operation, or read from, in the case of a gather operation. The loading operation must also enter into memory the instructions comprising the main routine or program.

The program may be initiated by setting the address of the initial instruction into Instruction Counter 36. The location specified by Instruction Counter 36 is read out of memory via Information bus 15 to Program register 24. While this takes place, the Instruction Counter 36 is one-upped to address memory for the next instruction upon the execution of the first program instruction. The program is directed by the instructions generally taken from the sequential locations of memory.

When a record scatter variable (RSV) instruction word is encountered during the program routine, it is fed along Information bus 15 into Program register 24 in the same manner as preceding instruction words. Immediately, the O*p* portion positions sign, 0 and 1, are interpreted by Operation Matrix 33 to initiate the RSV operation.

A musical chairs situation arises as address information is rearranged for the execution of the RSV instruction. The result of the rearrangement is this:

The single block address is in Address register 29.

The address of the second RDW is in the Address Control register 92.

The first RDW is in the Record Definition register 51.

The RSV execution follows:

Read out data word from address specified by Address register 29 to the Arithmetic register 104. One-up Address register 29. Store data word (Arithmetic register) in working address per Start register 52. Increase working address by variable increment (Variable Increment register 101) and compare with Stop address (Stop register 53).

Repeat execution until working address equals stop address, then read out next instruction to the Program register 24 per the Instruction Counter 36.

The musical chairs situation is necessary to replace the RDW address in Program register positions 6–9 with the single block address. The actual manipulations are in three basic groups as follows:

TRANSFER CONTROL 1

(*a*) Positions 4–5 of the Program register locate an index word in memory. This index word (positions 2–5 contain the single block address) is placed in the Record Definition register.

(*b*) The single block address passes to the Location register.

(*c*) The address of the first RDW (Program register positions 6–9) passes via the computer address bus to the Address Control register.

(*d*) The single block address passes from the Location register to Program register positions 6–9.

TRANSFER CONTROL 2

The first RDW address passes via the Computer Address bus 40 to Core Address triggers 23 to read out the first RDW to the Record Definition register. The Address Control register 92 is one-upped by plus-one adder 93 to address the second RDW. The start address in Start register 52 is compared to the stop address in Stop register 53 for Start≤Stop by true input of the start address and complement input of the stop address to main computer Adder 103. A no carry out indicates Start≤Stop; a carry out indicates RDW error.

TRANSFER CONTROL 3

The first data word is read out from memory per the single block address and stored per the working address. The working address is variable incremented and compared with the stop address. Execution continues as explained above, with the successive single block words being stored at working address locations separated as specified by the variable increment.

As the first word is transferred to the location specified by the start address, the start address is advanced by the variable increment under control of Adder 103 to provide a working address. The working address specifies where the next data word should be read into (out on RGV) memory. Thus, with each word entry into memory, the working address is increased by the variable increment factor. On every cycle, a comparison is made of the working and stop addresses. When an equal condition is reached, indicating equality between the working and stop addresses of the record control word, a test is made of the sign of the record control word to determine whether the scatter operation is to continue to another location in memory or whether operation is to terminate. A plus sign indicates that the operation is to continue, under control of a new RDW to be selected from memory. A minus sign indicates the end of the scatter operation.

The operation that develops when the sign in Sign register 73 is "plus" is one in which the Address Control register 92 issues a new address to the Core Address trigger 23, the latter calling out the next record definition word from memory. The Address Control register is provided with +1 adder 93 so that the initial address can be one-upped.

In the preferred embodiment shown, validity checks are taken on the Arithmetic bus 14 and Information bus 15 by VC blocks 82 and 83. Memory references, to an address specified by Core Address triggers 23, involve inhibit drivers 17, sense amplifiers and drivers 18 and Memory Buffer register 19. The Memory Buffer register connects to Information bus 15 for a full-word transfer. Arithmetic operations in serial mode involve switches 54, 57, 64 and 102. These are essentially single-digit buffer registers which, together with their associated registers, form serial mode shift registers with capacity to recirculate data or to have data altered serial by digit.

In a commercial embodiment not shown, plus-one adders 38, 95 and 93 are replaced by a single time shared plus-one adder. Address register 29 is called "Program Register D"; the Record Definition register 24 is called "Auxiliary Register" and the Location register 75 either omitted entirely or called "Address Start Register." Address Control register 92 is sometimes called "RDW Address Register."

*Recapitulation*

The invention directs data from a single block in memory 16 to variably spaced locations within a small block according to a record definition word RDW which includes sign, variable increment, start and stop address. During setup, Address register 29 is set to the single block initial address and Address Control register 92 to the first RDW address. The RDW is set into registers Sign 73, Variable Increment 101, Start (working address) 52 and Stop 53. The single block data word is read out per Address register 29 (which is then one-upped by adder 95) to Arithmetic register 104. The start address passes via Location register 75 and Computer Address bus 40 to Core Address triggers 23, which stores the data word in the small block location. The start address and the variable increment then pass through main computer Adder 103; the sum (working address) returns to the Start register 52 and simultaneously is compared with the stop address by Compare Unit 60. When the working address equals the stop address, Match unit 68 and Sign register 73 determine from the RDW sign whether to fetch another RDW or the next instruction.

While the invention has been particularly shown and described with reference to a preferred embodiment, it will be understood by those skilled in the art that various changes in form and details may be made without departing from the spirit and scope of the invention.

What is claimed is:

In a data processing system having a memory provided with addressable locations for storing data words and a variety of instruction words, programming means controlled by the instructions for controlling the manipulation of the data words; the combination of means for effecting, in the memory, record scatter or record gather operations plus variable open-sequence operations in the scatter or gather sequences under the control of record definition words, each constituted of a sign, a variable increment, a start and a stop address, and each stored in other addressable locations of the memory comprising:

a location address register for receiving and storing the address of a record definition word derived from an instruction in said programming means;

a record definition register constituted of a sign register, a variable increment register, a start address register and a stop address register, respectively, for receiving and storing the sign, the variable increment, the start and stop address of a programmed record definition word;

address selection control means responsive to the address settings in said start register for selecting a data word location in the memory for record read or write;

address comparing means connected to said start and stop registers for comparing the address settings and providing an equal signal in response to an equal comparison between said address settings;

a record definition word sign interrogating means operable in response to an equal comparing signal to provide a control to continue or disable the scatter read or write operations depending upon the character of the sign interrogated;

a summing means to vary the start address in said start address register by summing the variable increment in said variable increment register to the present start address in said start address register whereby the scatter or gather sequences are opened in increments the size of the variable increment read into the system by the record definition word.

References Cited in the file of this patent

UNITED STATES PATENTS 2,968,027 McDonnell et al. ------- Jan. 10, 1961